1,894,347

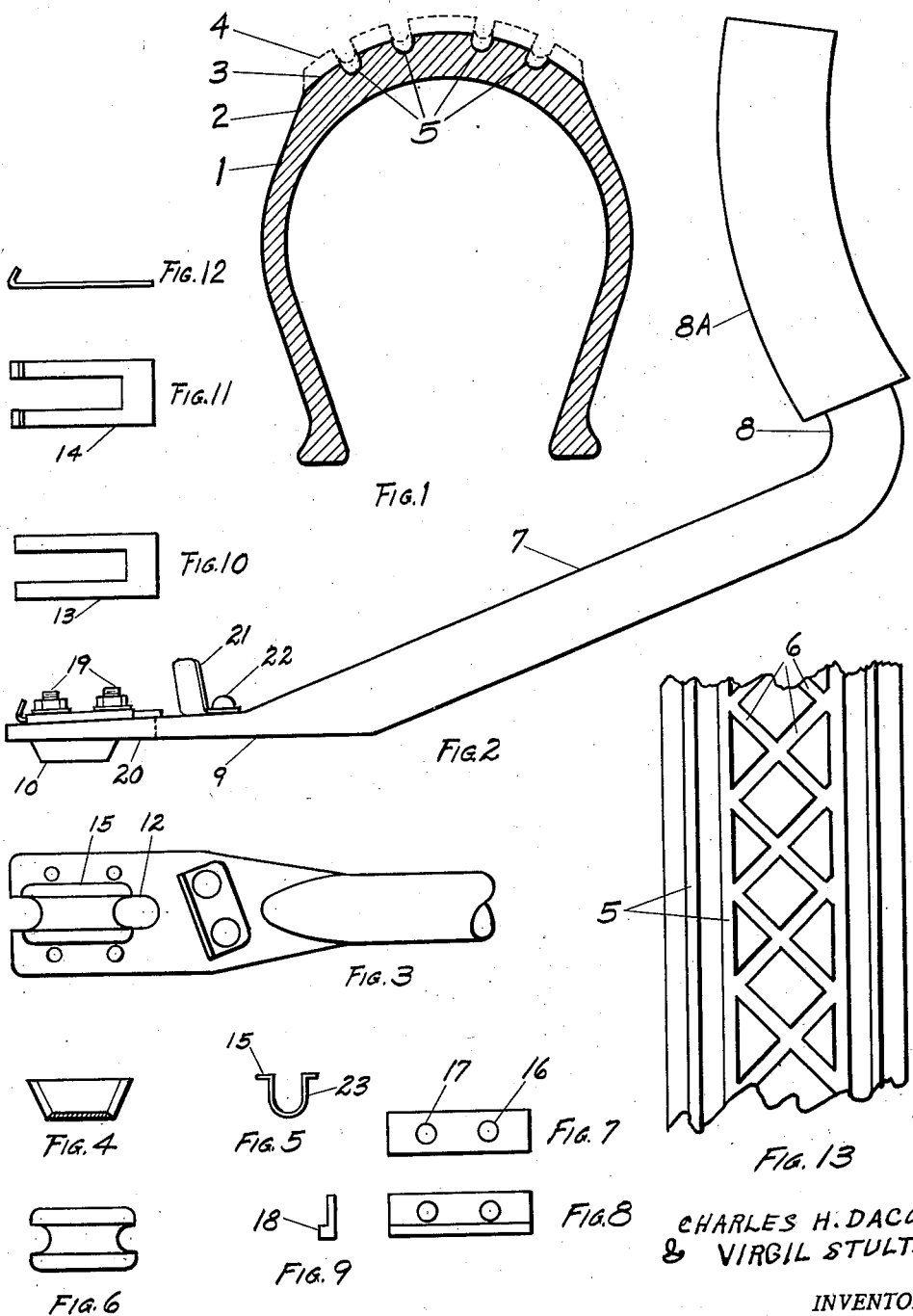

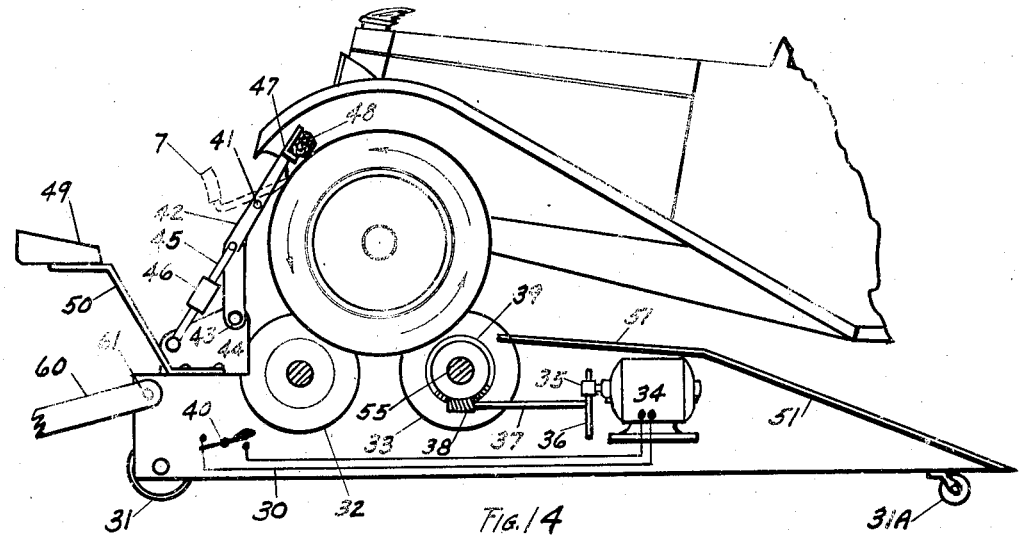
Fig. 14
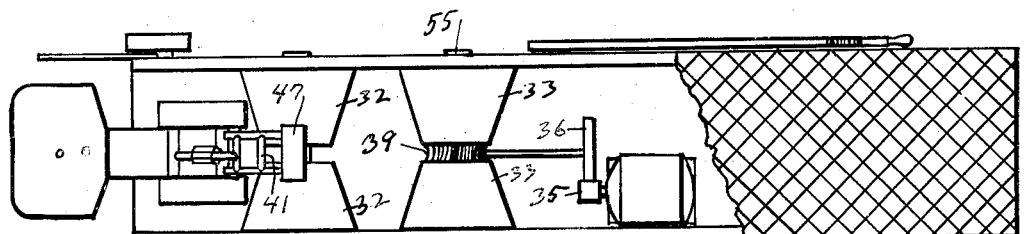
Fig. 15
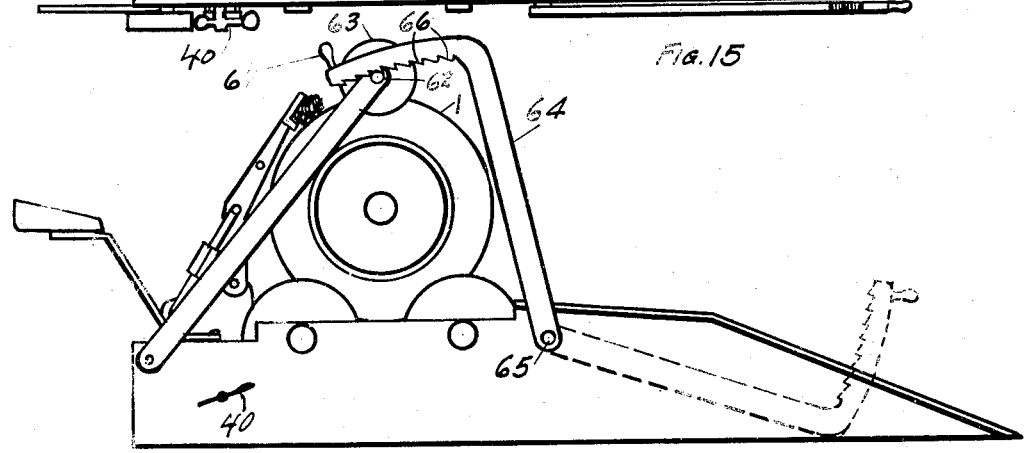
Fig. 16
Fig. 17
CHARLES H. DACON &
VIRGIL STULTS INVENTORS
BY George R. Ericson
ATTORNEY Patented Jan. 17, 1933

UNITED STATES PATENT OFFICE

CHARLES H. DACON AND VIRGIL STULTS, OF ST. LOUIS, MISSOURI, ASSIGNORS TO ST. LOUIS TIRE RETREADING MACHINE COMPANY, OF ST. LOUIS, MISSOURI, A CORPORATION OF MISSOURI

APPARATUS FOR RETREADING TIRES

Application filed March 10, 1932. Serial No. 597,988.

It will be understood that the invention is susceptible of many modifications, and, accordingly, we do not wish to be limited in our protection, except as set forth in the accompanying claims.

This invention relates to devices for retreading tires after the original tread has worn down to a point where it is too smooth for safety. We know that it is old to apply new treads to tires which have been worn through, by cementing or vulcanizing a new and additional strip of rubber having a tread formed thereon to the smooth outer surface of the old tire, but this method is not satisfactory for the reason that the cement may not stick tightly, and the tread may be torn off by centrifugal force during high speed operation of the tire. Also, in applying such treads to the tire, it has been customary to vulcanize the tread on to the tires, and this reheating of the old rubber frequently causes serious injury which may result in a blowout.

It is an object of this invention to provide a non-skid tread on the old tire by simply deepening or recutting the original groove formed in the tread without any heat treatment or cementing whatsoever and without the addition of any new rubber to the tires.

Other objects will appear from the following description and accompanying drawings, referring to which:

Figure 1 is a cross sectional view showing a tire which has become worn and which has been retreaded by our process.

Figure 2 shows a side elevation of a hand cutting tool which we have provided for recutting the tread.

Figure 3 shows a plan view of the knife holding portion of our cutting tool, the knife attaching nuts, shims, and cover plates having been removed for better illustration of the knife.

Figure 4 shows a side view of the knife.

Figure 5 shows an end view of the knife.

Figure 6 shows a plan view of the knife.

Figure 7 shows a plan view of one of the cover plates.

Figure 8 shows an inverted plan view of the cover plate shown in Figure 7.

Figure 9 shows an end view of the cover plate.

Figure 10 is a plan view of one of the shims used for adjusting the depth of cut.

Figure 11 is a plan view of another of the shims for adjusting the depth of the cut.

Figure 12 is a side view of the shim shown in Figure 11.

Figure 13 is a diagram showing one form of tread which may be cut with our device.

Figure 14 shows a diagrammatic side elevation of a tread cutting rack according to our invention, with the front end of an automobile on the rack.

Figure 15 shows a plan view of the rack.

Figure 16 shows a diagrammatic side elevation of the rack as used for cutting treads on tires which have been removed from the automobile, but left on the rim.

Figure 17 shows a blank rack to support the opposite side of the automobile.

The reference numeral 1 indicates the body of a tire having a tread portion 2 which has been worn down to the point indicated by the solid line 3. The original shape of the tire when new is indicated by the dotted lines 4, and the new grooves which we cut according to our process are shown in solid line 5. It will be understood that the cross grooves 6, as shown in Figure 13, may be cut in any shape desired and preferably should conform to the original grooves in the tire, particularly if these grooves have not become so worn down that they are no longer visible.

The reference numeral 7 indicates the main body member of the retreading tool. This body member is preferably formed from a rod of cold rolled steel and comprises the shank portion 7, a bent up handle portion 8, and a tool holding portion 9 which is flattened out and formed at an angle to the shaft 7, as indicated in Figure 2. The handle is provided with a piece of rubber hose 8A for comfort in operating. It will be noted that the portion 9 is not only flattened, but slightly tapered so that one end will be thicker than the other. Preferably, the outer end is made thinnest. This is for the purposes of enabling the operator to make a fine adjustment of the depth of the groove by adjusting the cutting tool 10 longitudinally in the groove 12, and to give the tool a clearance with respect to the bottom of the groove.

The coarse adjustment of the depth of the tool may be made by inserting shims 13 and 14 either above or below the flanges 15 which are formed on the cutter. It will be understood that when the shims are inserted above the cutting tool they have no effect on its depth, but placing them in this position when they are not required below the tool eliminates the necessity of providing a separate receptacle to retain them when they are not in use. A cutter plate 16 formed with screw holes 17 and having a flange 18 is provided at each side of the flattened portion of the tool holder. The openings 17 receive studs 19 which are preferably brazed or welded to the separate prongs or sides of the flattened portion of the cutting tool.

The taper of the flattened portion causes the cutter to be held at an angle to the lower surface 20 of the flattened portion 9, and frequently the cutter is held at an angle to the bottom of the groove, so that enough clearance for free cutting is provided. The thumb rest 21 is suitably attached to the rear end of the flattened portion by rivets 22 or other suitable means.

The cutter comprises the flange 15 and the U-shaped cutting portion 23. The outer walls of the cutter are formed perfectly straight, and the inner walls are sharpened, as indicated in Figure 4, so that the sharpened portion will not interfere with the clearance between the tool and the bottom of the groove.

In order to conveniently cut grooves in tires of a vehicle without removing them from the automobile, we provide the cutting rack shown in Figures 14, 15, and 16. This rack comprises a frame 30 which may be mounted on rollers 31 and 31A, so that it will be conveniently moved from place to place. A pulling handle may be provided, if desired. The frame carries a pair of rolls 32 and 33 which may be grooved to center the wheel, as indicated. At least one of the rolls is driven by a motor 34 through a reduction gearing comprising a pinion 35 which is attached to the end of the motor shaft, gears 36 meshing with pinion 35, and shaft 37 to which are keyed the gear 36 and a worm 38 which meshes with worm gear 39 which is fixed to the roll 33.

The motor is controlled by a switch lever 40 and is arranged to be operated by the foot of the operator. A tool rest 41 comprising a horizontal bar is carried by a yoke 42 which is pivotally mounted, as at 43, to suitable supports 44 on the end of the frame. The yoke 42 is firmly held in position by a brace 45 which has one end pivoted to the yoke and the other pivoted to the supports 44. A turn buckle 46 is provided for adjusting the position of the yoke to the tool rest 41.

A sponge holder 47 is carried by the upper end of the yoke for the purpose of applying soap water or other lubricant to the tire as it approaches the cutting tool. A sponge 48 saturated in this lubricant may conveniently be used as an applicator.

A seat 49 is mounted on the frame by means of a support 50, so that the operator may conveniently sit while holding the cutting tool generally indicated by the reference numeral 7. The end of the frame opposite the seat is provided with an inclined track portion 51 of sufficient width, so that the automobile may be conveniently driven up on to the rack. This merely for the purpose of supporting the front wheel of the car as it is being driven on the rolls.

We have shown only one rack and, in most cases, both sides of one end of the car must be supported at the same level in order to bring the wheel into a vertical plane. In order to do this, another rack may be provided. Both racks may be separate or attached to each other and driven by the same motor, if desired. In which case, the shaft 55 of the roll 33 would extend from one rack to the other and drive the opposite roll. Also, a blank rack of any kind may be provided. This blank rack might be simply a block such as indicated in Figure 17. It should be noted that Figure 17 is drawn on a smaller scale than Figure 14, and the blank rack simply comprises the wedge 56 shown in perspective in that figure.

The reference numeral 60 indicates a pair of lateral supports which are pivoted as at 61 to the frame. These supports carry a cross shaft 62 at their upper ends, and a grooved roller 63 is mounted on the cross shaft. A pair of hooks 64 are pivotally carried at 65 on the sides of the frame. These hooks are provided with teeth, as indicated at 66, and a handle 67. When it is desired to cut a tire which is mounted on the rim and filled with air under pressure, but which is not on the automobile, the tire is placed in position, as shown in Figure 16, and the roller 63 is swung over and rested on top of the tire thus holding it in correct vertical position. The hooks 64 are then lifted to the position shown in solid lines in Figure 16 and driven backwardly so as to tightly engage the shaft 62, thus bringing the roller 63 down firmly on the tire to hold it in position. When it is desired to cut the tires without removing them from the automobile, the hooks 64 are freed from the shaft 62 with a hammer, and the hooks are then laid back in the position shown in dotted lines in Figure 16. The roll is then laid back to the position indicated in Figure 14. The hooks being on each side of the rack do not interfere with the wheel of the car as it is driven on to the rolls.

In the case of some makes of automobiles, it will be desirable to turn the steering gear sharply to the right or left to bring the front wheel out from under the fender. Inasmuch as this can not conveniently be done prior to driving the car on to the rolls, it is necessary to swing the rack around as the steering gear is turned, and I have provided casters 31A at at least one end of the rack for that purpose.

In operation, the tire is mounted in position on the rolls and held there either by the weight of the automobile or by the roller 63. The operator rests his tool on the cross member 41 and sets the motor 34 in operation in a direction such as to drive the tire in an anti-clockwise direction with reference to Figures 14 and 16. The circumferential grooves in the tire are quickly cut in this manner, and the cross grooves are cut by hand, the yoke 42 being removed, if desired, for this purpose.

We claim:

1. A tool for retreading old tires comprising a flattened and forked tool holding portion, an upwardly inclined shank, and a handle at the end of said shank opposite the tool holding portion.

2. A tool for retreading old tires comprising a flattened and forked tool holding portion, an upwardly inclined shank, a handle at the end of said shank opposite the tool holding portion, and a second hand support adjacent the tool holding portion.

3. A tool for retreading tires comprising a forked and flattened portion, said portion having a gradual taper in thickness along the length of the fork, and a removable U-shaped tool having outwardly extending flanges at the upper end of the U, and means including said flanges for attaching said tool to said fork.

4. A tool for retreading worn tires comprising a U-shaped member formed of sheet metal and having outwardly extending flanges at each side of the U, the U-shaped portion of said member having cutting edges at least at one end.

5. A tool for retreading worn tires comprising a U-shaped member formed of sheet metal and having outwardly extending flanges at each side of the U, the U-shaped portion of said member having cutting edges at least at one end, said edges being sharpened by beveling from the inside, and the outside of said U-shaped portion being comparatively straight.

6. A tire retreading tool comprising a forked member, a U-shaped cutting tool having outwardly extending flanges, one end of said U-shaped portion being sharpened, and clamping means for detachably fixing the flanges of said cutting tool to said fork.

7. A tire retreading tool comprising a forked member, a U-shaped cutting tool having outwardly extending flanges, one end of said U-shaped portion being sharpened, and clamping means for detachably fixing said cutting tool to said fork in such a position that the U portion passes through the prongs thereof, said fork being tapered in thickness from one end toward the other.

8. In a tire retreading device, a frame, a pair of rolls carried by said frame, a motor for driving one of said rolls, a third roller adjustably mounted with respect to said frame, and means carried by said frame for clamping said third roller in position to hold a tire.

9. In a tire retreading device, a frame, a pair of rolls carried by said frame, a motor for driving one of said rolls, a third roller adjustably mounted with respect to said frame, means carried by said frame for clamping said third roller in position to hold a tire, and a tool support mounted on said frame.

10. In a tire retreading device, a frame, a pair of grooved rollers carried by said frame, means for operating at least one of said rolls, a third roller carried by said frame, means for moving at least one of said rollers with respect to the other two, and an adjustable tool support carried by said frame.

11. In a device of the class described, a portable frame, a tool support carried by said frame and adapted to be held thereby in a position adjacent the periphery of a rotating tire, a movable tool supported on said tool support, said tool having a cutting edge and a depth gauging member, means for pressing said cutting edge against the periphery of said tire until said depth gauging member contacts therewith, said tool and said tool support being constructed and arranged to permit movement of the tool with respect to the frame during the rotation of the tire, whereby a groove of constant depth may be cut in the periphery of said tire without regard to variations in the circularity thereof.

12. In a device of the class described, a frame, a seat for an operator carried by said frame, a tool support carried by said frame, a tool holder carried by said tool support, a cutting tool carried by said tool holder and adapted to be pressed into contact with a rotating tire, means carried by said tool holder to prevent the sinking of said tool into said tire, beyond a certain depth, said tool holder being movable on said tool support to permit the cutting tool to follow irregularities in the periphery of said tire.

13. In a device of the class described, a frame, means carried by said frame for causing the rotation of a tire, a tool support carried by said frame, a tool holder supported on said tool support, said holder being movable with respect to said support, a U-shaped cutting tool carried by said tool holder, a guard to prevent the sinking of said cutter in said tire beyond a fixed depth, and means to press said cutter and guard against said tire during the rotation thereof.

14. In a device of the class described, a frame, a tire rotating device carried by said frame, a motor for operating said tire rotating device, a foot switch for controlling said motor, a tool support carried by said frame, a cutting tool movably carried by said tool support, and means for gauging the depth of the tool cut by said groove with respect to the periphery of said tire without regard to the circularity thereof.

In testimony whereof we affix our signatures.

CHARLES H. DACON.
VIRGIL STULTS.